US012078184B2

(12) United States Patent
Shimojo et al.

(10) Patent No.: US 12,078,184 B2
(45) Date of Patent: Sep. 3, 2024

(54) COMPRESSOR CONTROL DEVICE, CONTROL METHOD FOR COMPRESSOR, AND CONTROL PROGRAM PRODUCT FOR COMPRESSOR

(71) Applicant: MITSUBISHI HEAVY INDUSTRIES, LTD., Tokyo (JP)

(72) Inventors: Kengo Shimojo, Tokyo (JP); Kentaro Suzuki, Tokyo (JP); Hidetaka Okui, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/200,763

(22) Filed: May 23, 2023

(65) Prior Publication Data

US 2023/0400034 A1 Dec. 14, 2023

(30) Foreign Application Priority Data

Jun. 8, 2022 (JP) ................................. 2022-092667

(51) Int. Cl.
*F04D 27/00* (2006.01)
*F04D 19/02* (2006.01)
(Continued)

(52) U.S. Cl.
CPC ....... *F04D 27/002* (2013.01); *F04D 27/0246* (2013.01); *F04D 29/284* (2013.01); (Continued)

(58) Field of Classification Search
CPC .. F04D 27/002; F04D 27/0246; F04D 29/284; F04D 29/287; F04D 19/02; F04D 29/563; F05D 2250/51; F05D 2270/303
See application file for complete search history.

(56) References Cited

FOREIGN PATENT DOCUMENTS

FR 2531490 A1 * 2/1984
JP 2002-61594 2/2002
(Continued)

OTHER PUBLICATIONS

English Machine translation of FR2531490A1 via USPTO Fit Database; translated on Mar. 3, 2024 (Year: 1984).*
(Continued)

*Primary Examiner* — Dominick L Plakkoottam
*Assistant Examiner* — Paul W Thiede
(74) *Attorney, Agent, or Firm* — Wenderoth, Lind & Ponack, L.L.P.

(57) ABSTRACT

A compressor control device includes: an inlet guide vane disposed in an inlet section of a compressor; a variable stationary blade disposed downstream of the inlet guide vane; a rotor blade disposed between the inlet guide vane and the variable stationary blade; a first actuator for adjusting a first opening degree of the inlet guide vane; a second actuator for adjusting a second opening degree of the variable stationary blade; a compressor inlet temperature detection part for detecting a compressor inlet temperature in the inlet section; and a control part for controlling the first actuator and the second actuator. The control part controls the first actuator and the second actuator such that an opening degree ratio of the first opening degree to the second opening degree increases as the compressor inlet temperature decreases, if the compressor inlet temperature is less than a threshold.

8 Claims, 7 Drawing Sheets

(51) Int. Cl.

| | |
|---|---|
| ***F04D 27/02*** | (2006.01) |
| ***F04D 29/28*** | (2006.01) |
| ***F04D 29/56*** | (2006.01) |

(52) U.S. Cl.
CPC ............ *F04D 29/287* (2013.01); *F04D 19/02* (2013.01); *F04D 29/563* (2013.01); *F05D 2250/51* (2013.01); *F05D 2270/303* (2013.01)

(56) References Cited

FOREIGN PATENT DOCUMENTS

| | | | | |
|---|---|---|---|---|
| JP | 2012-117524 | | 6/2012 | |
| JP | 2015021477 A | * | 2/2015 | ............ F01D 11/003 |
| JP | 2019052586 A | * | 4/2019 | |

OTHER PUBLICATIONS

English Machine translation of JP2019052586A via USPTO Fit Database; translated on Mar. 3, 2024 (Year: 2019).*

* cited by examiner

COMPRESSOR CONTROL DEVICE, CONTROL METHOD FOR COMPRESSOR, AND CONTROL PROGRAM PRODUCT FOR COMPRESSOR

TECHNICAL FIELD

The present disclosure relates to a compressor control device, a control method for a compressor, and a control program product for the compressor.

This application claims the priority of Japanese Patent Application No. 2022-092667 filed on Jun. 8, 2022, the content of which is incorporated herein by reference.

BACKGROUND

A compressor is known which is configured to generate a compressed gas supplied to equipment such as, for example, a gas turbine or an internal combustion engine. In the compressor, for example, supply air is taken in via an inlet guide vane (IGV) disposed in an inlet section, and the compressed gas is generated by rotor blades and stationary blades disposed over a plurality of stages downstream of the inlet guide vane.

In this type of compressor, the opening degree of the inlet guide vane or the stationary blade may be configured variable to control the opening degree according to a load of the compressor. For example, Patent Document 1 discloses a control technique of evaluating loads of respective stages and adjusting, with an actuator, the opening degree of a stationary blade (variable stationary blade) in the stage where the load is high, thereby averaging the loads of the respective stages.

CITATION LIST

Patent Literature

Patent Document 1: JP2002-61594A

SUMMARY

In the compressor capable of controlling the opening degree of the inlet guide vane or the stationary blade as described above, if an inlet temperature (intake air temperature) of the compressor is decreased by, for example, cold climates or a climate change, the density of intake air taken into the compressor increases. In this case, it is conceivable to suppress the intake air amount of the compressor by controlling the opening degree of the inlet guide vane to decrease so that the excessive amount of the compressed gas is not supplied to a supply destination of the compressor. However, decreasing the opening degree of the inlet guide vane decreases the load of the rotor blade disposed downstream of the inlet guide vane, resulting in a decrease in air temperature supplied to the stationary blade disposed further downstream of the rotor blade. Consequently, a loss is increased by increasing a flow velocity (Mach number) supplied to the stationary blade, resulting in a decrease in efficiency of the compressor.

At least one embodiment of the present disclosure has been made in view of the above, and the object of the at least one embodiment of the present disclosure is to provide a compressor control device, a control method for a compressor, and a control program product for the compressor which are capable of suppressing a decrease in efficiency even if a compressor inlet temperature decreases.

In order to solve the above-described problems, a compressor control device according to at least one embodiment of the present disclosure, includes an inlet guide vane disposed in an inlet section of a compressor; a variable stationary blade disposed downstream of the inlet guide vane; a rotor blade disposed between the inlet guide vane and the variable stationary blade; a first actuator for adjusting a first opening degree of the inlet guide vane; a second actuator for adjusting a second opening degree of the variable stationary blade; a compressor inlet temperature detection part for detecting a compressor inlet temperature in the inlet section; and a control part for controlling the first actuator and the second actuator. The control part controls the first actuator and the second actuator such that an opening degree ratio of the first opening degree to the second opening degree increases as the compressor inlet temperature decreases, if the compressor inlet temperature is less than a threshold.

In order to solve the above-described problems, a control method for a compressor according to at least one embodiment of the present disclosure is a control method for a compressor including: an inlet guide vane disposed in an inlet section of the compressor; a variable stationary blade disposed downstream of the inlet guide vane; a rotor blade disposed between the inlet guide vane and the variable stationary blade; a first actuator for adjusting a first opening degree of the inlet guide vane; and a second actuator for adjusting a second opening degree of the variable stationary blade, the control method for the compressor, including: a step of detecting a compressor inlet temperature in the inlet section, and a step of controlling the first actuator and the second actuator such that an opening degree ratio of the first opening degree to the second opening degree increases as the compressor inlet temperature decreases, if the compressor inlet temperature is less than a threshold.

In order to solve the above-described problems, a control program product for a compressor according to at least one embodiment of the present disclosure is a control program product for a compressor including: an inlet guide vane disposed in an inlet section of the compressor; a variable stationary blade disposed downstream of the inlet guide vane; a rotor blade disposed between the inlet guide vane and the variable stationary blade; a first actuator for adjusting a first opening degree of the inlet guide vane; and a second actuator for adjusting a second opening degree of the variable stationary blade, the control program product for the compressor, configured to cause a computer to implement; a step of detecting a compressor inlet temperature in the inlet section; and a step of controlling the first actuator and the second actuator such that an opening degree ratio of the first opening degree to the second opening degree increases as the compressor inlet temperature decreases, if the compressor inlet temperature is less than a threshold.

According to at least one embodiment of the present disclosure, it is possible to provide a compressor control device, a control method for a compressor, and a control program product for the compressor which are capable of suppressing a decrease in efficiency even if a compressor inlet temperature decreases.

DETAILED DESCRIPTION

Figure 1:
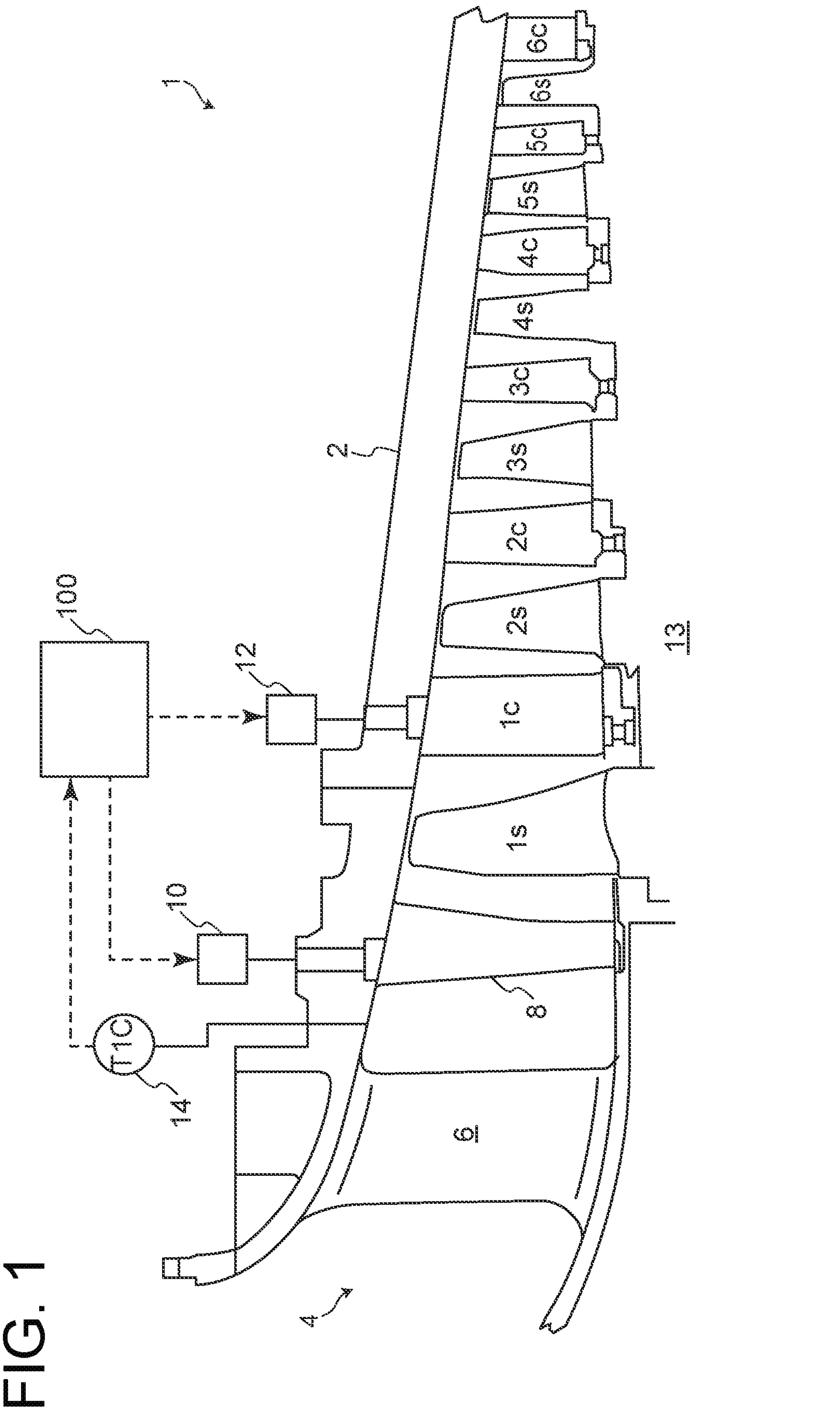
FIG. 1 is a cross-sectional view schematically showing the configuration of a compressor according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

FIG. 1 is a cross-sectional view schematically showing the configuration of a compressor 1 according to an embodiment. The compressor 1 is an axial compressor capable of generating a compressed gas by compressing gas (such as air) taken in from the outside and supplying the compressed gas to another downstream equipment (such as a gas turbine or an internal combustion engine).

The compressor 1 includes a casing 2. A compressor inlet section 4 for taking in intake air is disposed upstream of the casing 2. A plurality of struts 6 are disposed around the compressor inlet section 4, and an inlet guide vane 8 is disposed downstream thereof.

The inlet guide vane 8 is a variable vane whose opening degree (first opening degree D1) is variable by changing a vane angle of the inlet guide vane 8. The first opening degree D1 can be adjusted by changing the vane angle with a first actuator 10 connected to the inlet guide vane 8. The operation of the first actuator 10 is controlled based on a command from a control device 100 described later.

Blades for compressing the intake air taken in from the compressor inlet section 4 are disposed over a plurality of stages downstream of the inlet guide vane 8. These blades include a plurality of rotor blades 1S to 6S which are disposed in a rotational shaft 13 rotatably accommodated in the casing 2 and a plurality of stationary blades 1C to 6C disposed on an inner surface of the casing 2. These rotor blades 1S to 6S and stationary blades 1C to 6C are alternately arrayed along the axial direction of the rotational shaft 13. That is, the rotor blade 1S and the stationary blade 1C are disposed in the first stage in the array of the respective blades, the rotor blade 2S and the stationary blade 2C are disposed in the second stage, and thereafter, the rotor blades 3S to 6S and the stationary blades 3C to 6C are respectively disposed in the same manner, thereby configuring a six-stage compressor.

Although FIG. 1 illustrates a case where the number of stages of the compressor is six, the number of stages is not limited.

The stationary blade 1C is a variable stationary blade whose opening degree (second opening degree D2) is variable by changing a blade angle of the stationary blade 1C. The second opening degree D2 can be adjusted by changing the blade angle with a second actuator 12 connected to the stationary blade 1C. The operation of the second actuator 12 is controlled based on a command from the control device 100 described later.

The following description focuses on the stationary blade 1C among the stationary blades 1C to 6C. However, if the other stationary blades 2C to 6C are also configured as the variable stationary blades, the configuration regarding the stationary blade 1C is also applicable to the stationary blades 2C to 6C. Further, the opening degrees (second opening degrees D2) of the stationary blades 1C to 6C may be adjustable independently of each other, or may be adjustable in conjunction with each other by a link mechanism (not shown), for example.

The compressor 1 of the above configuration is provided with a temperature sensor 14 for detecting a compressor inlet temperature T1C. The temperature sensor 14 is installed in the compressor inlet section 4, and is disposed between the strut 6 and the inlet guide vane 8 of the inner surface of the casing 2 in FIG. 1.

The compressor inlet temperature TIC is substantially equal to an outside air temperature, and thus the temperature sensor 14 may be disposed at a position where the outside air temperature can be detected.

The compressor 1 includes the control device 100 (compressor control device) for controlling the compressor 1. The control device 100 includes, for example, a Central Processing Unit (CPU), a Random Access Memory (RAM), a Read Only Memory (ROM), a computer-readable storage medium, and the like. Then, a series of processes for realizing various functions is stored in the storage medium or the like in the form of a program, as an example. The CPU reads the program out to the RAM or the like and executes processing/calculation of information, thereby realizing the various functions. A configuration where the program is installed in the ROM or another storage medium in advance, a configuration where the program is provided in a state of being stored in the computer-readable storage medium, a configuration where the program is distributed via a wired or wireless communication means, or the like may be applied. The computer-readable storage medium is a magnetic disk, a magneto-optical disk, a CD-ROM, a DVD-ROM, a semiconductor memory, or the like.

Figure 2:
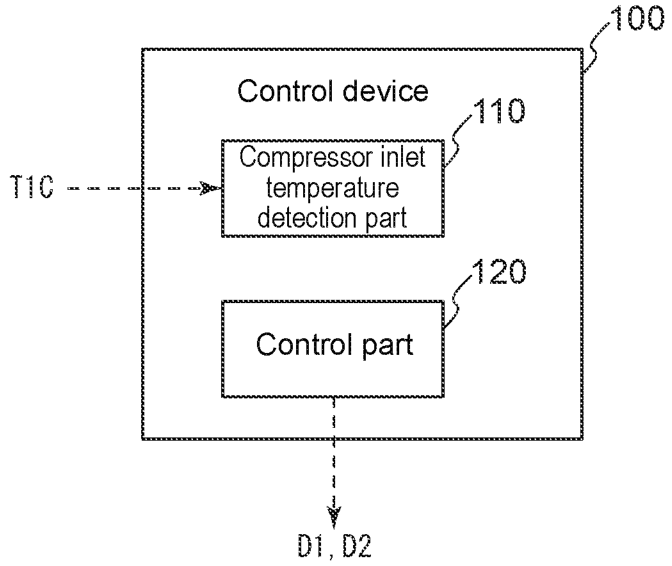
FIG. 2 is a block configuration diagram showing the internal configuration of a control device in FIG. 1.

FIG. 2 is a block configuration diagram showing the internal configuration of the control device 100 in FIG. 1. The control device 100 includes a compressor inlet temperature detection part 110 and a control part 120.

The compressor inlet temperature detection part 110 is configured to detect the compressor inlet temperature TIC. Specifically, the compressor inlet temperature detection part 110 is configured to detect the compressor inlet temperature TIC by acquiring a detection signal of the temperature sensor 14 described above.

The control part 120 is configured to control the first actuator 10 and the second actuator 12 based on the compressor inlet temperature TIC detected by the compressor inlet temperature detection part 110. That is, the first opening degree D1 of the inlet guide vane 8 and the second opening degree D2 of the variable stationary blade 1C can be adjusted by controlling the first actuator 10 and the second actuator 12 with the control part 120.

If the compressor inlet temperature T1C is decreased by, for example, cold climates or a climate change in the compressor 1, the density of the intake air taken into the compressor 1 increases. In this case, it is conceivable to reduce at least either of the inlet guide vane 8 and the variable stationary blade 1C so that the excessive amount of the compressed gas is not supplied to a supply destination of the compressor 1. Herein, as a reference technique, an assumed case where control is performed such that the first opening degree D1 of the inlet guide vane 8 is decreased as the compressor inlet temperature TIC decreases while the second opening degree D2 of the variable stationary blade 1C is kept substantially constant (that is, a case where control is performed such that an opening degree ratio D1/D2 of the first opening degree D1 to the second opening degree D2 decreases) will be examined.

Figure 3:
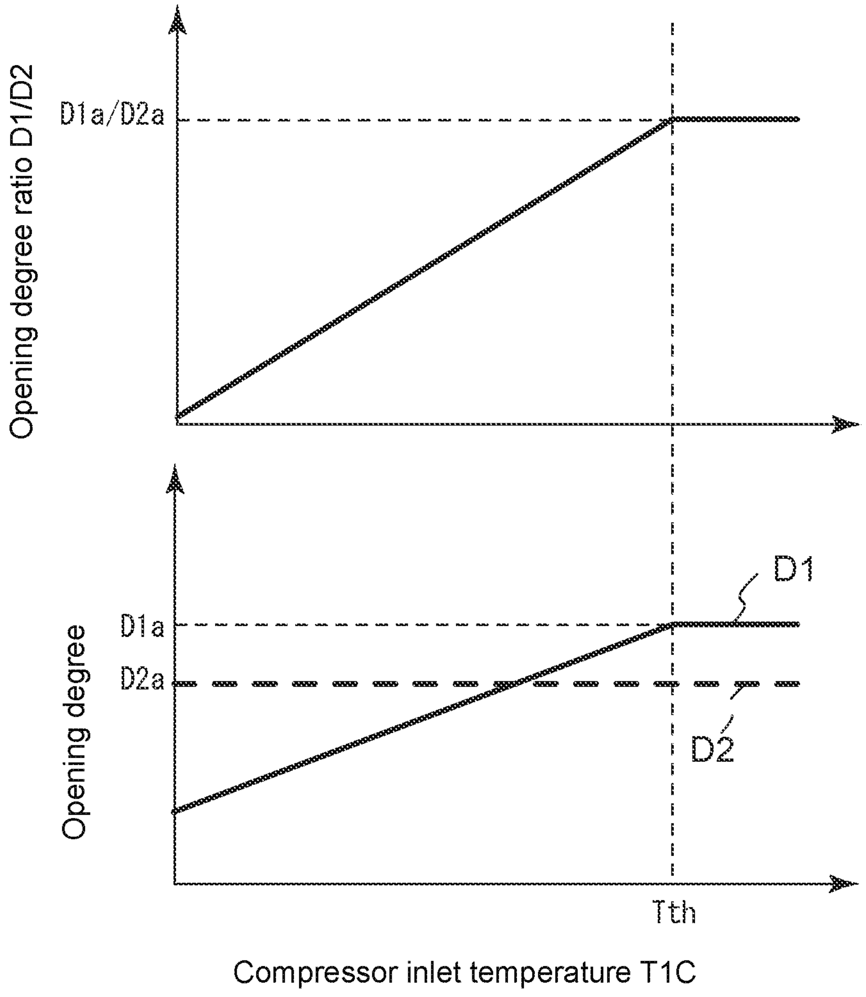
FIG. 3 is an example of control with respect to the opening degree ratio of the first opening degree and the second opening degree, and a compressor inlet temperature of absolute values according to a reference technique.
Figure 4:
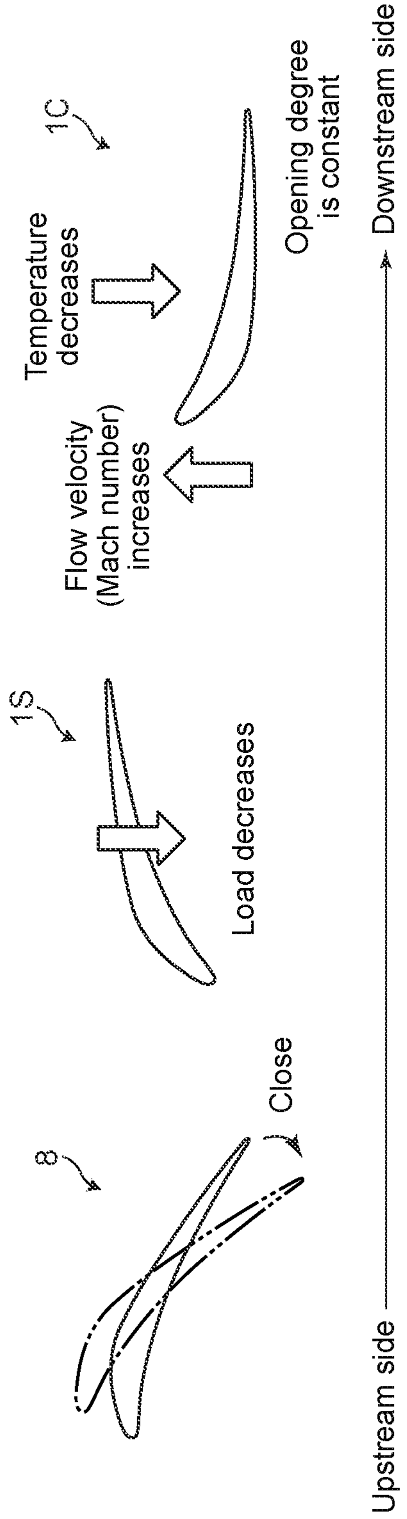
FIG. 4 is a schematic view schematically showing a state of an inlet guide vane, a rotor blade, and a variable stationary blade in FIG. 3.

FIG. 3 depicts two graphs that provide an example of control with respect to the opening degree ratio D1/D2 of the first opening degree D1 to the second opening degree D2 and the compressor inlet temperature T1C of the absolute values D1, D2 according to a reference technique. FIG. 4 is a schematic view showing a state of the inlet guide vane 8, the rotor blade 1S, and the variable stationary blade 1C with reference to the graphs shown in FIG. 3. In FIGS. 3 and 4, it is assumed that a load (output) of the compressor 1 is maintained constant at a rated load (rated output), output) and FIG. 4 shows the inlet guide vane 8, the rotor blade 1S, and the variable stationary blade 1C among the components of the compressor 1 as previously shown in FIG. 1.

In this reference technique, in a temperature range where the compressor inlet temperature T1C is not less than a threshold Tth, as shown in FIG. 3, the first opening degree D1 of the inlet guide vane 8 and the second opening degree D2 of the variable stationary blade 1C are respectively kept substantially constant at opening degrees D1a, D2a respectively corresponding to the loads of the compressor 1. More specifically, the control part 120 controls the opening degree ratio D1/D2 according to the load of the compressor 1, by using the opening degree ratio D1/D2 of the first opening degree D1 to the second opening degree D2 as a control parameter. In the present embodiment, since the load (output) of the compressor 1 is maintained constant at the rated load (rated output), the first opening degree D1a and the second opening degree D2a are decided so as to be the opening degree ratio D1/D2 corresponding to the rated load.

On the other hand, in a temperature range where the compressor inlet temperature T1C is less than the threshold Tth, the second opening degree D2 of the variable stationary blade 1C is kept substantially constant at the opening degree D2a with respect to the compressor inlet temperature T1C, whereas the first opening degree D1 of the inlet guide vane 8 decreases from the opening degree D1a as the compressor inlet temperature T1C decreases, thereby controlling the opening degree ratio D1/D2 to decrease. If the first opening degree D1 of the inlet guide vane 8 thus decreases, as shown in FIG. 4, the load of the rotor blade 1S decreases downstream of the inlet guide vane 8 and the air temperature supplied to the variable stationary blade 1C decreases further downstream of the rotor blade 1S. Consequently, a loss is increased by increasing a flow velocity (Mach number) supplied to the variable stationary blade 1C, resulting in a decrease in efficiency of the compressor 1. Such problems are suitably solved by the embodiments described below.

Figure 5:
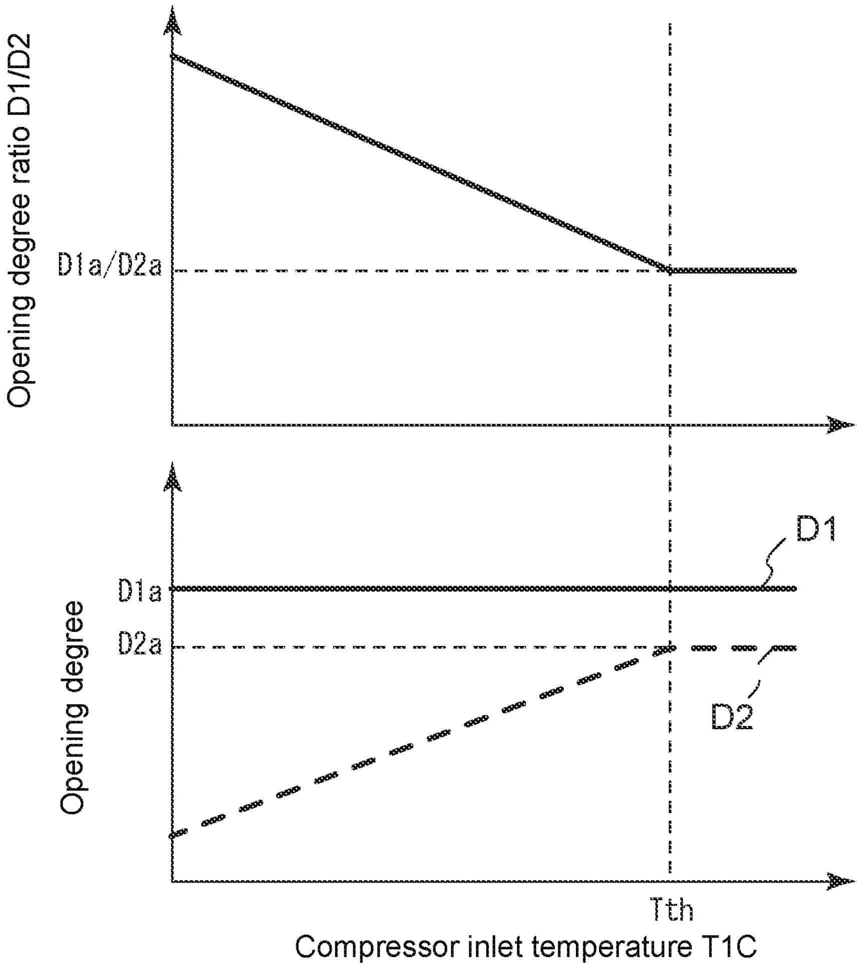
FIG. 5 is an example of control with respect to the opening degree ratio of the first opening degree and the second opening degree, and the compressor inlet temperature of the absolute values according to an embodiment.
Figure 6:
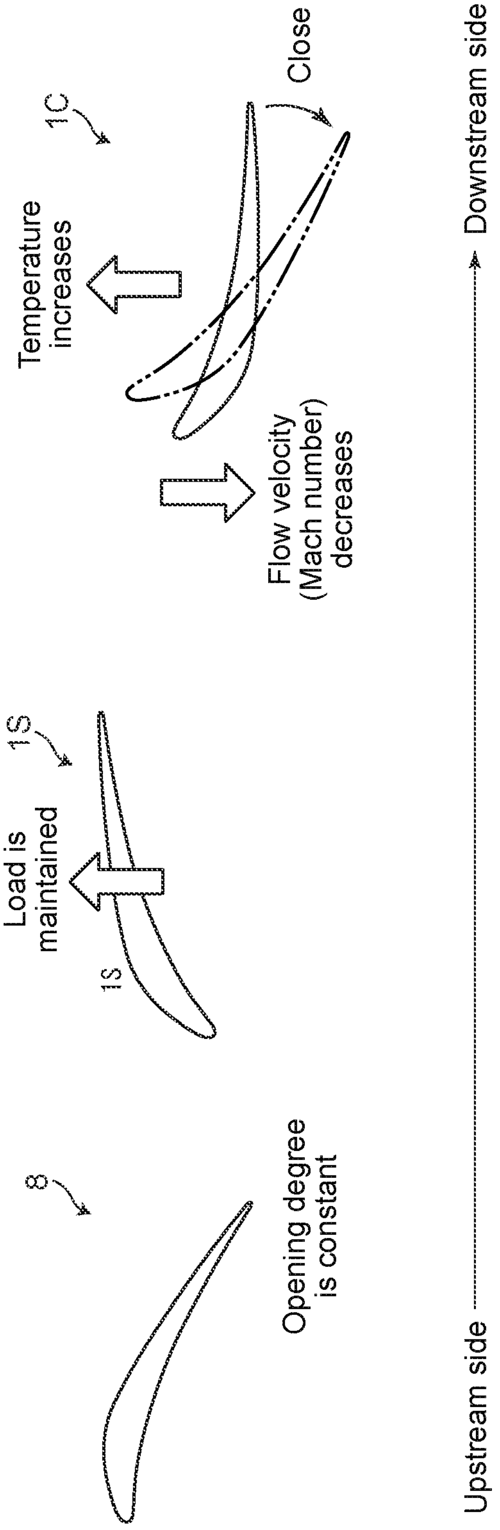
FIG. 6 is a schematic view schematically showing a state of the inlet guide vane, the rotor blade, and the variable stationary blade in FIG. 5.

FIG. 5 depicts two additional graphs that provide an example of control with respect to the opening degree ratio D1/D2 of the first opening degree D1 to the second opening degree D2, and the compressor inlet temperature T1C of the absolute values D1, D2 according to an embodiment, and FIG. 6 is a schematic view schematically showing a state of the inlet guide vane 8, the rotor blade 1S, and the variable stationary blade 1C in FIG. 5. As with FIGS. 3 and 4 described above, in FIGS. 5 and 6, it is assumed that the load (output) of the compressor 1 is maintained constant at the rated load (rated output), and FIG. 6 extracts and schematically shows the inlet guide vane 8, the rotor blade 1S, and the variable stationary blade 1C among the components of the compressor 1 shown in FIG. 1.

In the present embodiment, in the temperature range where the compressor inlet temperature T1C is not less than the threshold Tth, as with FIG. 3, the first opening degree D1 of the inlet guide vane 8 and the second opening degree D2 of the variable stationary blade 1C are kept substantially constant at the opening degrees D1a, D2a, respectively, so as to be the opening degree ratio D/D2 corresponding to the load (rated load).

On the other hand, in the temperature range where the compressor inlet temperature T1C is less than the threshold Tth, the control part 120 controls the first actuator 10 and the second actuator 12 such that the opening degree ratio D1/D2 of the first opening degree D1 to the second opening degree D2 increases as the compressor inlet temperature T1C decreases. In FIG. 5, as an example of such control, control is performed such that the first opening degree D1 of the inlet guide vane 8 is kept substantially constant at the first opening degree D1a with respect to the compressor inlet temperature T1C, whereas the second opening degree D2 of the variable stationary blade 1C decreases from the opening degree D2a as the compressor inlet temperature T1C decreases.

Additionally, describing the control of the first opening degree D1 and the second opening degree D2 by the control part 120 from the viewpoint of the opening degree change rate, the control part 120 controls the first actuator 10 and the second actuator 12 such that a second change rate R2 of the second opening degree D2 with respect to the compressor inlet temperature T1C is greater than a first change rate R1 of the first opening degree D1 with respect to the compressor inlet temperature T1C if the compressor inlet temperature T1C is less than the threshold Tth. In the present embodiment, as shown in FIG. 5, in the temperature range where the compressor inlet temperature T1C is less than the threshold Tth, the first opening degree D1 is kept substantially constant and thus the first change rate R1 is substantially zero, whereas the second opening degree D2 decreases as the compressor inlet temperature T1C decreases and thus the second change rate R2 is greater than the first change rate R1.

Consequently, since the opening degree of the variable stationary blade 1C is decreased relatively more than that of the inlet guide vane 8 as the density of the intake air taken into the compressor 1 increases due to the decrease in the compressor inlet temperature T1C, it is possible to suppress the generation of the compressed gas by decreasing the opening degree of the variable stationary blade 1C while suppressing the decrease in opening degree of the inlet guide vane 8 and to suitably control the amount of the compressed gas supplied from the compressor 1 to the supply destination. At this time, since the decrease in opening degree of the inlet guide vane 8 is suppressed compared to the above-described reference technique, as shown in FIG. 6, the load of the rotor blade 1S on the downstream side of the inlet guide vane 8 less decreases and the increase in flow velocity (Mach number) supplied to the stationary blade 1C on the further downstream side of the rotor blade 1S is suppressed.

As a result, it is possible to effectively suppress the decrease in efficiency of the compressor 1 even if the compressor inlet temperature T1C decreases.

The control of the first actuator 10 and the second actuator 12 by the control part 120 is performed such that if the compressor inlet temperature T1C is less than the threshold Tth, the opening degree ratio D1/D2 increases compared to the case where the compressor inlet temperature T1C is not less than the threshold Tth. That is, if the compressor inlet temperature T1C becomes lower than the threshold Tth, the control is performed such that the second opening degree D2 of the variable stationary blade 1C decreases relatively more than the first opening degree D1 of the inlet guide vane 8. Consequently, since the generation of the compressed gas is suppressed by decreasing the second opening degree D2 of the variable stationary blade 1C while suppressing the decrease in the first opening degree D1 of the inlet guide vane 8 if the compressor inlet temperature T1C decreases, the load of the rotor blade 1S on the downstream side of the inlet guide vane 8 less decreases and the increase in flow velocity (Mach number) supplied to the stationary blade 1C on the further downstream side of the rotor blade 1S is suppressed. As a result, it is possible to effectively suppress the decrease in efficiency of the compressor 1 even if the compressor inlet temperature T1C decreases.

Figure 7:
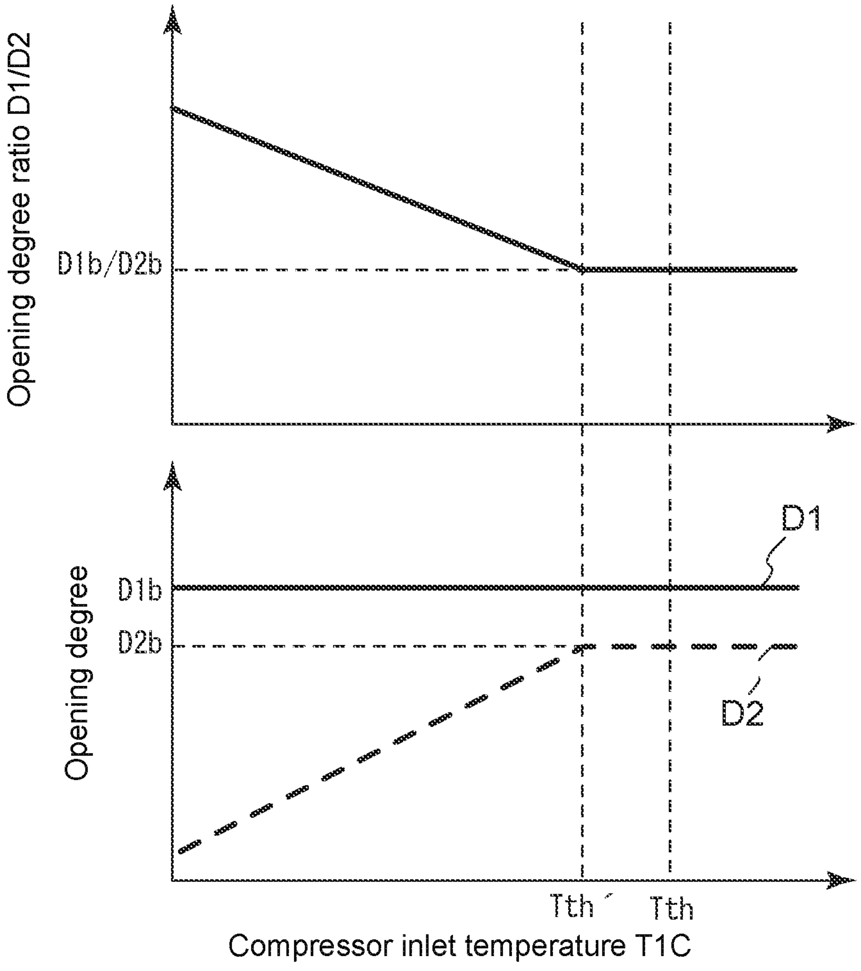
FIG. 7 is an example of control with respect to the opening degree ratio of the first opening degree and the second opening degree, and the compressor inlet temperature of the absolute values in a case where a load of a compressor 1 is a partial load.

Further, the threshold Tth may variably be set based on the load of the compressor 1. For example, the threshold Tth is set lower as the load of the compressor 1 decreases. FIG. 7 is an example of control with respect to the opening degree ratio D1/D2 of the first opening degree D1 to the second opening degree D2, and the compressor inlet temperature T1C of the absolute values D1, D2 in a case where the load of the compressor 1 is a partial load.

In FIG. 7, it is assumed that the load (output) of the compressor 1 is maintained constant at a predetermined partial load lower than the above-described rated load (rated output), and in a temperature range where the compressor inlet temperature T1C is not less than a threshold Tth' (<Tth) corresponding to a partial load value, the first opening degree D1 of the inlet guide vane 8 is kept substantially constant at an opening degree D1b corresponding to the partial load value and the second opening degree D2 of the variable stationary blade 1C is kept substantially constant at an opening degree D2b corresponding to the partial load value. These opening degrees Dib. D2b are respectively values smaller than the opening degrees D1a, D2a corresponding to the time of the rated load described above.

On the other hand, in the temperature range where the compressor inlet temperature T1C is less than the threshold Tth' corresponding to the partial load value, the control part 120 controls the first actuator 10 and the second actuator 12 such that the opening degree ratio D1/D2 of the first opening degree D1 to the second opening degree D2 increases as the compressor inlet temperature T1C decreases. In FIG. 7, as an example of such control, control is performed such that the first opening degree D1 of the inlet guide vane 8 is kept substantially constant at the opening degree D1a with respect to the compressor inlet temperature T1C, whereas the second opening degree D2 of the variable stationary blade 1C decreases from the opening degree D2a as the compressor inlet temperature T1C decreases.

Since the opening degrees of the inlet guide vane 8 and the variable stationary blade 1C differ according to the load, the compressor 1 can efficiently be operated by thus making the threshold Tth variable based on the load of the compressor 1.

As described above, according to the above embodiments, if the compressor inlet temperature becomes less than the threshold due to, for example, the cold climates or the climate change, the actuators are controlled such that the opening degree ratio of the first opening degree of the inlet guide vane to the second opening degree of the variable stationary blade increases as the compressor inlet temperature decreases. Consequently, since the opening degree of the variable stationary blade is decreased relatively more than that of the inlet guide vane as the density of the intake air taken into the compressor increases due to the decrease in the compressor inlet temperature, it is possible to suppress the generation of the compressed gas by decreasing the opening degree of the variable stationary blade w % bile suppressing the decrease in opening degree of the inlet guide vane and to suitably control the amount of the compressed gas supplied from the compressor to the supply destination. At this time, since the decrease in opening degree of the inlet guide vane is suppressed, the load of the rotor blade on the downstream side of the inlet guide vane less decreases and the increase in flow velocity (Mach number) supplied to the stationary blade on the further downstream side of the rotor blade is suppressed. As a result, it is possible to effectively suppress the decrease in efficiency of the compressor even if the compressor inlet temperature decreases.

As a result, it is possible to provide the compressor control device, the control method for the compressor, and the control program for the compressor which are capable of suppressing the decrease in efficiency even if the compressor inlet temperature decreases.

As for the rest, without departing from the spirit of the present disclosure, it is possible to replace the constituent elements in the above-described embodiments with known constituent elements, respectively, as needed and further, the above-described embodiments may be combined as needed.

The contents described in the above embodiments would be understood as follows, for instance.

(1) A compressor control device according to one aspect, includes: an inlet guide vane disposed in an inlet section of a compressor; a variable stationary blade disposed downstream of the inlet guide vane; a rotor blade disposed between the inlet guide vane and the variable stationary blade; a first actuator for adjusting a first opening degree of the inlet guide vane; a second actuator for adjusting a second opening degree of the variable stationary blade, a compressor inlet temperature detection part for detecting a compressor inlet temperature in the inlet section, and a control part for controlling the first actuator and the second actuator. The control part controls the first actuator and the second actuator such that an opening degree ratio of the first opening degree to the second opening degree increases as the compressor inlet temperature decreases, if the compressor inlet temperature is less than a threshold.

With the above aspect (1), if the compressor inlet temperature becomes less than the threshold due to, for example, the cold climates or the climate change, the actuators are controlled such that the opening degree ratio of the first opening degree of the inlet guide vane to the second opening degree of the variable stationary blade increases as the compressor inlet temperature decreases. Consequently, since the opening degree of the variable stationary blade is decreased relatively more than that of the inlet guide vane as the density of the intake air taken into the compressor increases due to the decrease in the compressor inlet temperature, it is possible to suppress the generation of the compressed gas by decreasing the opening degree of the variable stationary blade while suppressing the decrease in opening degree of the inlet guide vane and to suitably control the amount of the compressed gas supplied from the compressor to the supply destination. At this time, since the decrease in opening degree of the inlet guide vane is suppressed, the load of the rotor blade on the downstream side of the inlet guide vane less decreases and the increase in flow velocity (Mach number) supplied to the stationary blade on the further downstream side of the rotor blade is suppressed. As a result, it is possible to effectively suppress the decrease in efficiency of the compressor even if the compressor inlet temperature decreases.

(2) In another aspect, in the above aspect (1), the control part controls the first actuator and the second actuator such that the opening degree ratio increases compared to a case where the compressor inlet temperature is not less than the threshold, if the compressor inlet temperature is less than the threshold.

With the above aspect (2), control is performed such that the opening degree ratio increases compared to the case where the compressor inlet temperature is not less than the threshold, if the compressor inlet temperature decreases to less than the threshold. Whereby, the opening degree of the variable stationary blade is decreased relatively more than that of the inlet guide vane. Consequently, since the generation of the compressed gas is suppressed by decreasing the second opening degree of the variable stationary blade while suppressing the decrease in opening degree of the inlet guide vane even if the compressor inlet temperature decreases, the load of the rotor blade on the downstream side of the inlet guide vane less decreases and the increase in flow velocity (Mach number) supplied to the stationary blade on the further downstream side of the rotor blade is suppressed. As a result, it is possible to effectively suppress the decrease in efficiency of the compressor even if the compressor inlet temperature decreases.

(3) In another aspect, in the above aspect (1) or (2), the threshold is set lower as a load of the compressor decreases.

With the above aspect (3), since the opening degrees of the inlet guide vane and the variable stationary blade differ according to the load, the compressor can efficiently be operated by thus setting the threshold lower as the load of the compressor decreases.

(4) In another aspect, in any of the above aspects (1) to (3), the control part controls the first actuator and the second actuator such that a second change rate of the second opening degree with respect to the compressor inlet temperature is greater than a first change rate of the first opening degree with respect to the compressor inlet temperature, if the compressor inlet temperature is less than the threshold.

With the above aspect (4), the actuators are controlled such that the second change rate of the second opening degree of the variable stationary blade with respect to the compressor inlet temperature is greater than the first change rate of the first opening degree of the inlet guide vane with respect to the compressor inlet temperature, if the compressor inlet temperature becomes less than the threshold. Consequently, since the opening degree change rate of the variable stationary blade is relatively increased compared to that of the inlet guide vane, it is possible to suppress the generation of the compressed gas by decreasing the opening degree of the variable stationary blade while suppressing the decrease in opening degree of the inlet guide vane and to suitably control the amount of the compressed gas supplied from the compressor to the supply destination. At this time, since the decrease in opening degree of the inlet guide vane is suppressed, the load of the rotor blade on the downstream side of the inlet guide vane less decreases and the increase in flow velocity (Mach number) supplied to the stationary blade on the further downstream side of the rotor blade is suppressed. As a result, it is possible to effectively suppress the decrease in efficiency of the compressor even if the compressor inlet temperature decreases.

(5) In another aspect, in any of the above aspects (1) to (4), the control part controls the first actuator such that the first opening degree is kept, if the compressor inlet temperature is less than the threshold.

With the above configuration (5), the first opening degree of the inlet guide vane is kept, for example, substantially constant, if the compressor inlet temperature becomes less than the threshold. Whereby, the decrease in opening degree of the inlet guide vane is suppressed. Consequently, the load of the rotor blade on the downstream side of the inlet guide vane less decreases and the increase in flow velocity (Mach number) supplied to the stationary blade on the further downstream side of the rotor blade is suppressed. As a result, it is possible to effectively suppress the decrease in efficiency of the compressor even if the compressor inlet temperature decreases.

(6) In another aspect, in any of the above aspects (1) to (5), the compressor includes the variable stationary blades and the rotor blades in multiple stages, and the respective variable stationary blades are adjusted in conjunction with each other by the second actuator.

With the above aspect (6), the variable stationary blades and the rotor blades are disposed in the multiple stages downstream of the inlet guide vane. In such configuration, the variable stationary blades in the respective stages are adjusted in conjunction with each other by the second actuator.

(7) In another aspect, in any of the above aspects (1) to (6), the control part controls the opening degree ratio based on a load of the compressor.

With the above aspect (7), the inlet guide vane and the variable stationary blade are controlled based on the opening degree ratio corresponding to the load of the compressor. Thus, depending on the value of the load of the compressor, the inlet guide vane and the variable stationary blade are controlled with a predetermined relationship such that the opening degree ratio corresponding to the load is realized.

(8) A control method for a compressor according to one aspect is a control method for a compressor including: an inlet guide vane disposed in an inlet section of the compressor; a variable stationary blade disposed downstream of the inlet guide vane; a rotor blade disposed between the inlet guide vane and the variable stationary blade, a first actuator for adjusting a first opening degree of the inlet guide vane; and a second actuator for adjusting a second opening degree of the variable stationary blade, the control method for the compressor, including: a step of detecting a compressor inlet temperature in the inlet section; and a step of controlling the first actuator and the second actuator such that an opening degree ratio of the first opening degree to the second opening degree increases as the compressor inlet temperature decreases, if the compressor inlet temperature is less than a threshold.

With the above aspect (8), if the compressor inlet temperature becomes less than the threshold due to, for example, the cold climates or the climate change, the actuators are controlled such that the opening degree ratio of the first opening degree of the inlet guide vane to the second opening degree of the variable stationary blade increases as the compressor inlet temperature decreases. Consequently, since the opening degree of the variable stationary blade is decreased relatively more than that of the inlet guide vane as the density of the intake air taken into the compressor increases due to the decrease in the compressor inlet temperature, it is possible to suppress the generation of the compressed gas by decreasing the opening degree of the variable stationary blade while suppressing the decrease in opening degree of the inlet guide vane and to suitably control the amount of the compressed gas supplied from the compressor to the supply destination. At this time, since the decrease in opening degree of the inlet guide vane is suppressed, the load of the rotor blade on the downstream side of the inlet guide vane less decreases and the increase in flow velocity (Mach number) supplied to the stationary blade on the further downstream side of the rotor blade is suppressed. As a result, it is possible to effectively suppress the decrease in efficiency of the compressor even if the compressor inlet temperature decreases.

(9) A control program product for a compressor according to one aspect is a control program product for a compressor including: an inlet guide vane disposed in an inlet section of the compressor; a variable stationary blade disposed downstream of the inlet guide vane, a rotor blade disposed between the inlet guide vane and the variable stationary blade; a first actuator for adjusting a first opening degree of the inlet guide vane, and a second actuator for adjusting a second opening degree of the variable stationary blade, the control program product for the compressor, configured to cause a computer to implement: a step of detecting a compressor inlet temperature in the inlet section; and a step of controlling the first actuator and the second actuator such that an opening degree ratio of the first opening degree to the second opening degree increases as the compressor inlet temperature decreases, if the compressor inlet temperature is less than a threshold.

With the above aspect (9), if the compressor inlet temperature becomes less than the threshold due to, for example, the cold climates or the climate change, the actuators are controlled such that the opening degree ratio of the first opening degree of the inlet guide vane to the second opening degree of the variable stationary blade increases as the compressor inlet temperature decreases. Consequently, since the opening degree of the variable stationary blade is decreased relatively more than that of the inlet guide vane as the density of the intake air taken into the compressor increases due to the decrease in the compressor inlet temperature, it is possible to suppress the generation of the compressed gas by decreasing the opening degree of the variable stationary blade while suppressing the decrease in opening degree of the inlet guide vane and to suitably control the amount of the compressed gas supplied from the compressor to the supply destination. At this time, since the decrease in opening degree of the inlet guide vane is suppressed, the load of the rotor blade on the downstream side of the inlet guide vane less decreases and the increase in flow velocity (Mach number) supplied to the stationary blade on the further downstream side of the rotor blade is suppressed. As a result, it is possible to effectively suppress the decrease in efficiency of the compressor even if the compressor inlet temperature decreases.

The invention claimed is:

1. A compressor control device, comprising:

an inlet guide vane disposed in an inlet section of a compressor;

a variable stationary blade disposed downstream of the inlet guide vane;

a rotor blade disposed between the inlet guide vane and the variable stationary blade;

a first actuator for adjusting a first opening degree of the inlet guide vane;

a second actuator for adjusting a second opening degree of the variable stationary blade;

a compressor inlet temperature detection part for detecting a compressor inlet temperature in the inlet section; and a control part for controlling the first actuator and the second actuator, wherein the control part controls the first actuator and the second actuator such that an opening degree ratio of the first opening degree to the second opening degree increases as the compressor inlet temperature decreases, when the compressor inlet temperature is less than a threshold, and wherein the control part controls the first actuator and the second actuator such that a second change rate of the second opening degree with respect to the compressor inlet temperature is greater than a first change rate of the first opening degree with respect to the compressor inlet temperature, when the compressor inlet temperature is less than the threshold.

2. The compressor control device according to claim 1, wherein when the compressor inlet temperature is less than the threshold, the control part controls the first actuator and the second actuator such that variation of the opening degree ratio relative to the compressor inlet temperature increases compared to a case where the compressor inlet temperature is not less than the threshold.

3. The compressor control device according to claim 1, wherein the threshold is set lower as a load of the compressor decreases.

4. The compressor control device according to claim 1, wherein the control part controls the first actuator such that the first opening degree is a constant value, when the compressor inlet temperature is less than the threshold.

5. The compressor control device according to claim 1, wherein the compressor includes the variable stationary blades and the rotor blades in multiple stages, and wherein the respective variable stationary blades are adjusted in conjunction with each other by the second actuator.

6. The compressor control device according to claim 1, wherein the control part controls the opening degree ratio based on a load of the compressor.

7. A control method for a compressor including:

an inlet guide vane disposed in an inlet section of the compressor;

a variable stationary blade disposed downstream of the inlet guide vane;

a rotor blade disposed between the inlet guide vane and the variable stationary blade;

a first actuator for adjusting a first opening degree of the inlet guide vane; and a second actuator for adjusting a second opening degree of the variable stationary blade, the control method for the compressor comprising:

detecting a compressor inlet temperature in the inlet section;

controlling the first actuator and the second actuator such that an opening degree ratio of the first opening degree to the second opening degree increases as the compressor inlet temperature decreases, when the compressor inlet temperature is less than a threshold; and controlling the first actuator and the second actuator such that a second change rate of the second opening degree with respect to the compressor inlet temperature is greater than a first change rate of the first opening degree with respect to the compressor inlet temperature, when the compressor inlet temperature is less than the threshold.

8. A control program product for a compressor including:

an inlet guide vane disposed in an inlet section of the compressor;

a variable stationary blade disposed downstream of the inlet guide vane;

a rotor blade disposed between the inlet guide vane and the variable stationary blade;

a first actuator for adjusting a first opening degree of the inlet guide vane; and a second actuator for adjusting a second opening degree of the variable stationary blade, the control program product for the compressor being configured to cause a computer to perform:

detecting a compressor inlet temperature in the inlet section;

controlling the first actuator and the second actuator such that an opening degree ratio of the first opening degree to the second opening degree increases as the compressor inlet temperature decreases, when the compressor inlet temperature is less than a threshold; and controlling the first actuator and the second actuator such that a second change rate of the second opening degree with respect to the compressor inlet temperature is greater than a first change rate of the first opening degree with respect to the compressor inlet temperature, when the compressor inlet temperature is less than the threshold.

* * * * *